United States Patent
Kim et al.

(10) Patent No.: US 9,225,854 B2
(45) Date of Patent: Dec. 29, 2015

(54) HOST DEVICE CONNECTED TO IMAGE SCANNING DEVICE AND METHOD OF CONTROLLING THE HOST DEVICE BY CONVERTING SIGNAL ACCORDING TO PROTOCOL

(71) Applicant: Samsung Electronics Co., Ltd, Suwon-si, Gyeonggi-do (KR)

(72) Inventors: Sang-yeon Kim, Suwon-si (KR); Hak-ju Lee, Suwon-si (KR); Jung-mo Hong, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/024,883

(22) Filed: Sep. 12, 2013

(65) Prior Publication Data
US 2014/0118767 A1    May 1, 2014

(30) Foreign Application Priority Data
Nov. 1, 2012 (KR) ........................ 10-2012-0123086

(51) Int. Cl.
*G06F 3/12* (2006.01)
*H04N 1/00* (2006.01)

(52) U.S. Cl.
CPC ....... *H04N 1/00225* (2013.01); *H04N 1/00941* (2013.01)

(58) Field of Classification Search
USPC .......................................................... 358/1.13
See application file for complete search history.

(56) References Cited

U.S. PATENT DOCUMENTS

| | | | |
|---|---|---|---|
| 2006/0245018 A1* | 11/2006 | Byun | 358/527 |
| 2010/0245907 A1* | 9/2010 | Yoshida | 358/1.15 |
| 2010/0315686 A1* | 12/2010 | Hong et al. | 358/442 |
| 2010/0328689 A1* | 12/2010 | Koo et al. | 358/1.9 |
| 2012/0086989 A1* | 4/2012 | Collins et al. | 358/403 |
| 2012/0307277 A1* | 12/2012 | Kishida | 358/1.13 |

* cited by examiner

*Primary Examiner* — Qian Yang
(74) *Attorney, Agent, or Firm* — Staas & Halsey LLP

(57) ABSTRACT

A host device connected to image scanning devices and a method of controlling the host device is provided. The host device includes an interface connected to a plurality of image scanning devices, a storage storing an integrated driver that supports a plurality of drivers corresponding to a plurality of applications, and a controller controlling the integrated driver that supports the plurality of drivers to execute the driver corresponding to the application if the application is executed in the host device.

17 Claims, 12 Drawing Sheets

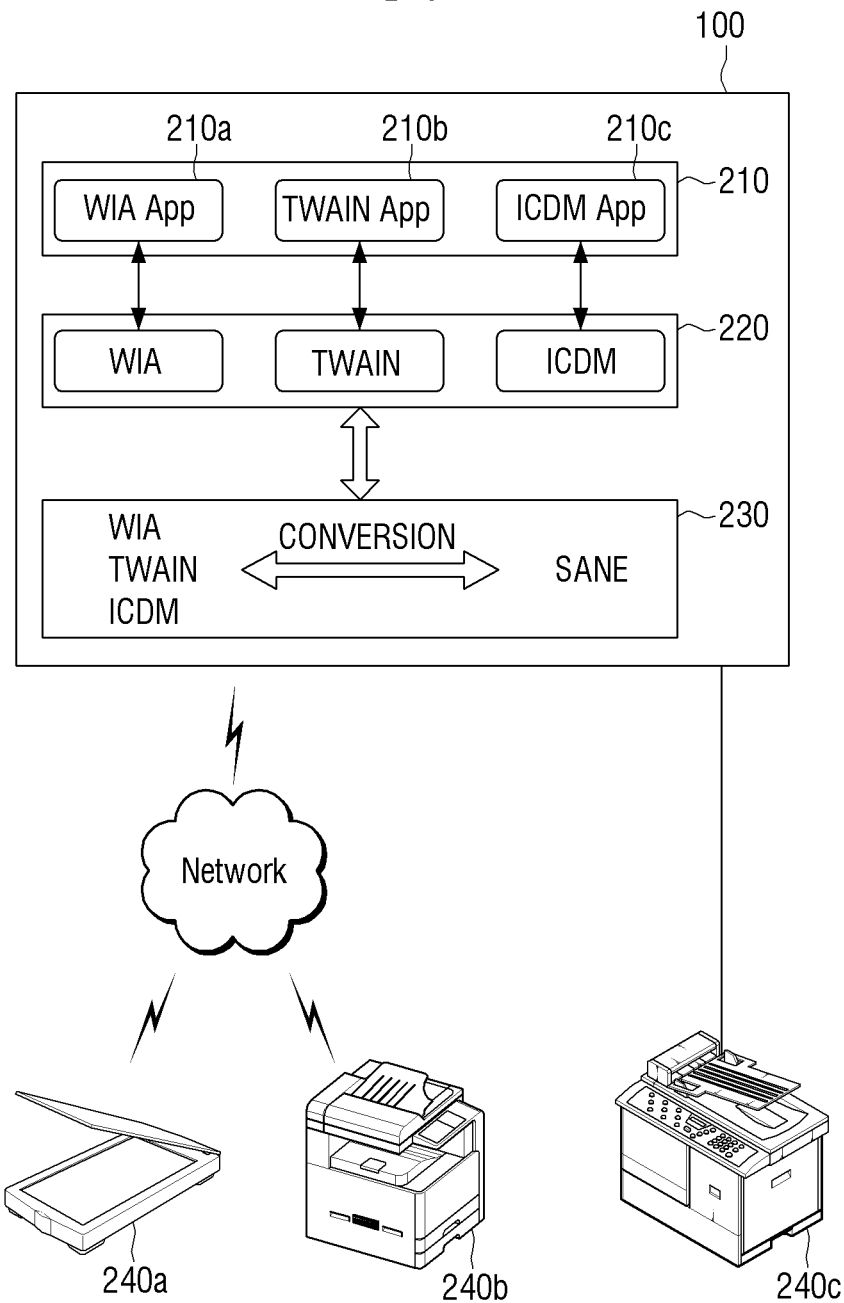

| User | TWAIN | SANE | Function |
|---|---|---|---|
| DRIVER EXECUTION | DG_CONTROL/ DAT_IDENTITY/ MSG_OPENDS | sane_init, sane_open sane_get_option_ description | SCAN DRIVER INITIALIZATION |
| OPTION SETTING | DG_CONTROL/ DAT_USERINTERFACE /MSG_ENABLEDS | sane_control_option | SET VALUE STORAGE |
| SCAN BUTTON CLICK | DG_IMAGE/ DAT_IMAGENATIVEXF ER/MSG_GET | sane_start, sane_read | IMAGE SCAN |
| SCAN COMPLETED | DG_CONTROL/ DAT_IDENTITY/ MSG_CLOSEDS | sane_cloxe, sane_exit | INITIALIZATION, DISCARD |

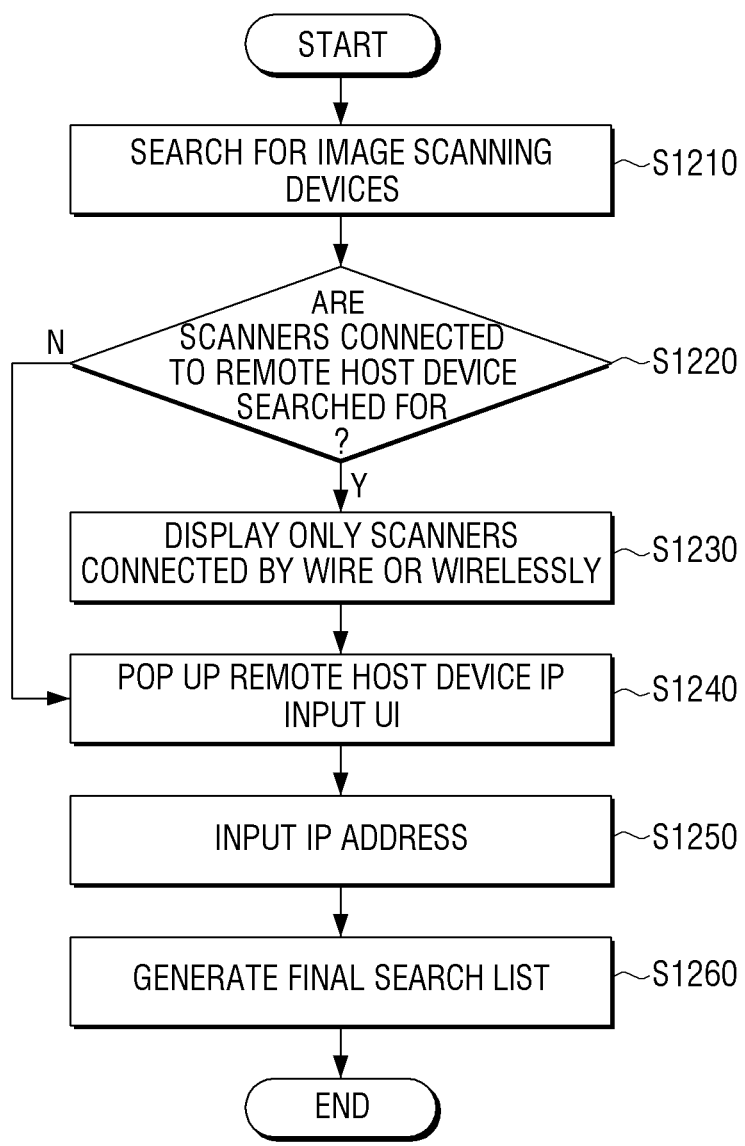

HOST DEVICE CONNECTED TO IMAGE SCANNING DEVICE AND METHOD OF CONTROLLING THE HOST DEVICE BY CONVERTING SIGNAL ACCORDING TO PROTOCOL

CROSS-REFERENCE TO RELATED APPLICATIONS

This application claims priority under 35 U.S.C. §119(a) from Korean Patent Application No. 10-2012-0123086, filed on Nov. 1, 2012, in the Korean Intellectual Property Office, the disclosure of which is incorporated herein by reference.

BACKGROUND OF THE INVENTION

1. Field of the Invention

The present general inventive concept relates to a host device and a method of controlling the host device, and more particularly, to a host device and a method of controlling the host device, which can control a plurality of image scanning devices through one integrated driver and enable a plurality of host devices to share the plurality of image scanning devices.

2. Description of the Related Art

A scanner is a device which can digitalize an image. The scanner reads an image, such as a photograph, a picture, and an illustration, with a CCD (Charge Coupled Device) that is a built-in image sensor and makes the read image as a computer file.

A scanner is classified into a flatbed scanner and a drum scanner. A flatbed scanner is a device that scans a printed manuscript that is put on a glass plate. If a separate adaptor is mounted on the flatbed scanner, film scan also becomes possible. The adaptor is mounted on an upper portion of the scanner to shield light. A drum scanner is a device that obtains a high-resolution image through high-speed scanning of an image attached to a round barrel.

In order to use either type of scanner, it is necessary to install a scanner driver in a host device to which the scanner is connected. The scanner driver is a program that converts general input/output commands used in the host device's O/S (Operating System) into a message form that the scanner can understand.

That is, the scanner driver converts a command that is transferred from an application to the scanner into a command to control the scanner, and has information on various kinds of commands related to the function of the scanner, document source information, and image types.

Each application can use one of several protocols, such as TWAIN, ICDM, WIA, and SANE protocols for example. As a result, scan drivers that support the respective protocols must be installed. The installed drivers communicate with the scanner using respective I/O (Input/Output) modules.

According to the above-described scan driver configuration in the related art, since respective drivers independently operate and different protocols that correspond to respective applications are used, another host device is unable to access and share the respective drivers. Even if the same protocol is used, an API (Application Program Interface) differs depending on the O/S of each host device, and thus the scan driver is unable to be shared between different kinds of O/Ss.

SUMMARY OF THE INVENTION

The present general inventive concept has been made to address at least the above problems and/or disadvantages and to provide at least the advantages described below. Accordingly, an aspect of the present general inventive concept provides a host device and a method of controlling the host device, which can share different scan drivers between different O/Ss through an integrated driver that uses a common protocol called SANE (Scanner Access Now Easy), and can share the scan drivers between host devices through a network.

Additional features and utilities of the present general inventive concept will be set forth in part in the description which follows and, in part, will be obvious from the description, or may be learned by practice of the general inventive concept.

Exemplary embodiments of the present general inventive concept provide a method of controlling a host device connected to a plurality of image scanning devices including: if the host device executes an application, using an integrated driver that supports a plurality of drivers to execute the driver that corresponds to the application, generating a signal with the driver according to a predetermined protocol, converting the signal according to a SANE (Scanner Access Now Easy) protocol, and transferring the converted signal to a selected one of the plurality of image scanning devices using the SANE protocol to perform an interaction corresponding to the application.

The driver may use one of TWAIN, ICDM, WIA, and SANE protocols.

The method may further include searching for image scanning devices connected to the host device, displaying a list of the searched image scanning devices, and selecting one of the image scanning devices in the list as the selected one of the plurality of image scanning devices.

Generating the signal according to the predetermined protocol may include displaying a scanning option selection UI (User Interface) according to an execution of the driver, and if a scanning option is set on the scanning option selection UI, generating the signal to include a set value according to the predetermined protocol.

The method may further include receiving a scanned image from the image scanning device according to the scanning option, and displaying an application execution screen including the received image.

The scanning option may include at least one of resolution, document source information, whether to support page count, an image type, a maximum support size, optical resolution, a supportable compression method, whether to support encryption, and whether to support user authentication.

The method may further include receiving a job comment, which is generated according to the predetermined protocol, from a network device that is connected to the host device through a network, converting the received job comment into a job comment according to the SANE protocol, transferring the converted job comment to the selected image scanning device using the SANE protocol, if the selected image scanning device acquires an image through performing an image scanning job according to the converted job comment, receiving the acquired image according to the SANE protocol, and transferring the received image to the network device according to a protocol used in the network device.

Exemplary embodiments of the present general inventive concept also provide a host device which includes: an interface connected to a plurality of image scanning devices, a storage storing an integrated driver that supports a plurality of drivers corresponding to a plurality of applications, and a controller controlling the integrated driver that supports the plurality of drivers to execute the driver corresponding to an application that is executed in the host device, wherein if a signal to be transferred to a selected one of the plurality of image scanning devices is generated according to a predetermined protocol corresponding to the driver, the controller converts the signal according to a SANE (Scanner Access Now Easy) protocol, and transfers the converted signal to the selected image scanning device through the interface to perform an interaction.

The driver may use one of TWAIN, ICDM, WIA, and SANE protocols.

The host device may further include a display displaying a list of the plurality of image scanning devices connected to the host device, and an inputter to select one of the image scanning devices on the list, wherein the controller executes the driver corresponding to the application that is executed in the host device using the integrated driver.

The display may display a scanning option selection UI (User Interface) if the driver is executed, and the converted signal generated by the controller may include a set value according to the protocol if a scanning option is set on the scanning option selection UI.

If an image that is scanned by the selected image scanning device according to the scanning option is received, the controller displays an application execution screen including the received image on the display.

The scanning option may include at least one of resolution, document source information, whether to support page count, an image type, a maximum support size, optical resolution, a supportable compression method, whether to support encryption, and whether to support user authentication.

If a job comment, which is generated according to the predetermined protocol, is received from a network device that is connected to the host device through a network, the controller may convert the received job comment into a job comment according to the SANE protocol and transfer the converted job comment to the selected image scanning device, and if the selected image scanning device acquires an image through performing an image scanning job according to the converted job comment, the controller may receive the acquired image according to the SANE protocol and transfer the received image to the network device.

Exemplary embodiments of the present general concept also provide a method of controlling a host device connected to a plurality of image scanning devices including: executing a driver that corresponds to an application being executed by the host device by using an integrated driver that supports a plurality of drivers, generating a signal with the driver according to a first protocol, converting the signal according to a second protocol, and transferring the converted signal to a selected one of the plurality of image scanning devices using the second protocol to perform an interaction corresponding to the application.

The method may further include using a network device that is connected to the host device through a network to generate the signal with the driver according to the first protocol, receiving an acquired image at the host device according to the second protocol if the selected image scanning device acquires an image through performing an image scanning job according to the converted signal, and transferring the received image to the network device according to the first protocol.

Exemplary embodiments of the present general inventive concept also provide a host device which includes: an interface connected to a plurality of image scanning devices, a storage to store an integrated driver that supports a plurality of drivers corresponding to a plurality of applications, and a controller to control the integrated driver to execute a driver among the plurality of drivers corresponding to an application that is being executed in the host device, wherein if a signal to be transferred to a selected one of the plurality of image scanning devices is generated according to a first protocol corresponding to the driver, the controller converts the signal according to a second protocol, and transfers the converted signal to the selected image scanning device through the interface to perform an interaction corresponding to the application.

The host device may further include a network device which generates the first signal according to the first protocol, wherein if the selected image scanning device acquires an image through performing an image scanning job according to the converted signal, the controller receives the acquired image according to the first protocol and transfers the received image to the network device.

As described above, according to the various exemplary embodiments of the present general inventive concept, the scanner drivers can be shared between the host devices through the network, and the same driver structure can be maintained regardless of the kinds of O/Ss.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 2 is a diagram explaining a method of communicating with image scanning devices through conversion of a protocol according to an exemplary embodiment of the present general inventive concept;

FIG. 3 is a diagram explaining a method of converting a protocol used in an application into a specific protocol according to an exemplary embodiment of the present general inventive concept;

FIG. 12 is a flowchart illustrating a method of controlling a scanner connected to a remote host device according to an exemplary embodiment of the present general inventive concept.

DETAILED DESCRIPTION OF THE PREFERRED EMBODIMENTS

Figure 1:
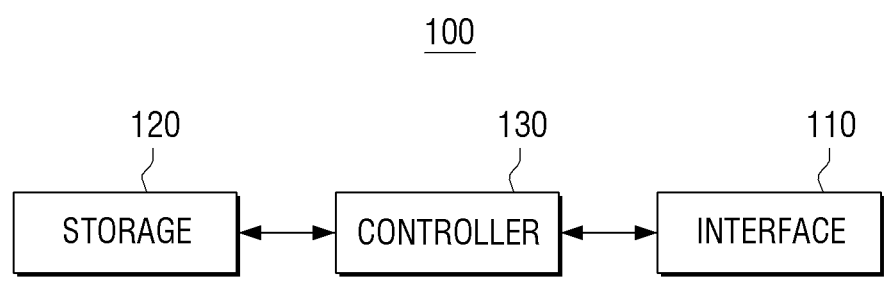
FIG. 1 is a block diagram illustrating the configuration of a host device 100 according to an exemplary embodiment of the present general inventive concept.

Reference will now be made in detail to the preferred embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram illustrating the configuration of a host device 100 according to an exemplary embodiment of the present general inventive concept. The host device 100 may be implemented by various types of electronic devices, such as for example a desktop PC, a laptop PC, a PDA, and a tablet PC.

An interface 110 connects the host device 100 to an image scanning device (not illustrated).

Through the interface 110, the host device 100 can receive an image acquired by the image scanning device and transmit a scanning option set by the host device 100 to the image scanning device.

For example, a user can set scanning option information, such as a resolution of a scanner, document source information, whether to support page count, an image type, a maximum support size, optical resolution, a supportable compression method, whether to support encryption, and whether to support user authentication, and such information may be transferred to the image scanning device through the interface 110.

Further, image information acquired according to the above-described option information may be transferred to the host device 100 through the interface 110.

The interface 110 may be provided with a wired communication port, such as a network interface card (not illustrated), and communicate with the image scanning device through the wired communication port. However, the present general inventive concept is not limited thereto, and the interface 110 may be provided with a wireless communication module that supports a communication network, such as a 3G network and a Wi-Fi network, to perform communication with the image scanning device.

A storage 120 stores an integrated driver that supports a plurality of drivers corresponding to a plurality of image scanning devices.

Since different protocols are typically used for respective applications, drivers corresponding to the different protocols are provided to control the image scanning devices connected to the host device 100.

For example, if an application called A drives a scanner using a TWAIN protocol, a scanner driver that supports TWAIN must be installed, while if an application called B drives a scanner using a WIA protocol, a scanner driver that supports WIA must be installed.

The storage 120 may store a plurality of drivers corresponding to the plurality of image scanning devices, and if a specific application is intended to be executed to drive the scanner, the storage 120 may provide the driver corresponding to the specific application.

The storage 120 may include at least one driver among drivers that support TWAIN, WIA, ICDM, and SANE protocols.

If an integrated driver that supports a plurality of drivers is stored in the storage 120, the drivers can be integratedly managed through installation of only one driver without the necessity of installing separate drivers according to the respective protocols that the applications support.

Further, images transmitted from the image scanning devices may be stored in the storage 120.

A controller 130 controls the overall operation of the host device 100 according to a user command. Specifically, if an application is executed in the host device, the controller 130 controls the integrated driver that supports the plurality of drivers to execute the driver corresponding to the application.

Thereafter, if a signal to be transferred to the image scanning device is generated according to the protocol corresponding to the driver, the controller 130 converts this signal into a signal according to a SANE (Scanner Access Now Easy) protocol, and performs an operation through transfer of this signal to the image scanning device through the interface 110.

In the case of converting the protocol corresponding to the driver into a SANE protocol, mapping data is used. For example, if the application uses the WIA protocol, the controller 130 may select the driver that supports the WIA protocol from the storage 120 and convert the WIA protocol into the SANE protocol using the mapping data.

The controller 130 may transmit a scan command to the image scanning device using the SANE protocol or may receive information from the image scanning device. In the case of receiving the information from the image scanning device, the controller 130 may convert the SANE protocol into the WIA protocol that the application uses again.

As described above, in the case of converting the protocol used in the application into the SANE protocol regardless of the kind of the protocol, one scanner can be shared between host devices connected through a network, and the same driver structure can be maintained regardless of the kind of the O/S and the kind of the protocol used in the application.

If the interaction with the image scanning device is performed through conversion of the SANE protocol, it becomes possible to install only one integrated driver regardless of the kind of O/Ss used in the respective host devices, and the image scanning device connected to the remote host device can be shared.

The host device 100 may further include a display (not illustrated) and an inputter (not illustrated).

For example, in the case where one scanner is shared between the host devices connected through the network, one host device may input the IP address of a remotely connected host device, and in this case, a list of scanners which are connected to the remote host device locally or by wire/wirelessly, is displayed to the user through the display.

The user can select a scanner to be used from the scanner list displayed on the display through the inputter to make the corresponding scanner perform the scan operation.

FIG. 2 is a diagram explaining a method of communicating with image scanning devices through conversion of a protocol according to an exemplary embodiment of the present general inventive concept.

At least one image scanning device (240a, 240b, 240c) is connected to the host device 100 through a communication interface.

The communication interface may be provided with a wired communication port, such as a network interface card, and may be connected for example through a USB. Alternatively the communication interface may be provided with a wireless communication module that supports a wireless communication network, such as a 3G network and a Wi-Fi network.

In the exemplary embodiment, for help in understanding, the host device 100 is connected to two image scanning devices 240a and 240b through a wireless network and is connected to one image scanning device 240c by wire.

Here, the image scanning devices 240a, 240b, and 240c connected to the host device 100 may be independent devices that perform only the scanning function, or multifunctional peripherals that perform multiple functions including the scanning function.

If an application 210 is executed, a corresponding driver is selected through the integrated driver 220. At this time, a protocol that the application uses may be any one of TWAIN (Technology Without An Important Name), WIA (Windows Image Acquisition), ICDM, and SANE.

For example, if an application 210a controls the image scanning device using the WIA protocol and the user activates the application 210a, a driver that supports the WIA protocol is selected through the integrated driver 220. In the same manner, if an application 210b or 210c that supports another protocol that is not the WIA is activated, the corresponding driver is selected.

The controller 130 converts this into the SANE protocol (conversion operation 230) regardless of the kind of the protocol that is used in the application, and interacts with the image scanning device by the SANE protocol through the interface 110.

If the image scanning devices 240a to 240c acquire images, an opposite process to the above-described process is performed. If the image scanning device transmits the acquired image information to the host device 100 through the interface 110, the host device 100 converts the SANE protocol into a protocol that the application uses and transfers the image information acquired by the image scanning device to the application.

In the above-described exemplary embodiment, if the host device 100 interacts with the image scanning device through conversion operation 230 of the SANE protocol regardless of the kind of the protocol that the application uses, the host device 100 can control the image scanning devices 240a to 240c regardless of the kind of the O/S that the host device 100 uses.

For example, in the case where a first host device using Windows as its operating system and a second host device using Linux as its operating system are connected through a network and an image scanning device is locally connected to the first host device, the scan driver is unable to be shared due to the difference of API in the related art.

However, according to an exemplary embodiment of the present general inventive concept, if the protocol that is used in the application of the operating system is converted into the SANE protocol, the scan drivers can be shared between the different O/Ss with the same driver structure.

On the other hand, when the protocol that is used in the application is converted into a predetermined specific protocol, the mapping table is used.

FIG. 3 is a diagram explaining a method of converting a protocol used in an application into a specific protocol according to an exemplary embodiment of the present general inventive concept.

In this exemplary embodiment, it is exemplified that a protocol that the application uses is TWAIN and the TWAIN protocol is converted into the SANE protocol.

If the user selects one of the plurality of scanners connected to the host device 100, the driver is executed using the TWAIN protocol that the application uses.

At this time, a function used in the TWAIN protocol of the application is "DG_CONTROL/DAT_IDENTITY/MSG_OPENDS". The controller 130 converts the above-described function into the SANE protocol using a protocol mapping table 300, and in this case, the corresponding SANE function is "sane_init{ }", "sane_open{ }".

If a scanner driver is selected, a scanning option UI (User Interface) of the selected scanner is provided to the user.

In this case, the scanning option that can be set by the user may include resolution, document source information, whether to support page count, an image type, a maximum support size, optical resolution, a supportable compression method, whether to support encryption, and whether to support user authentication.

If the user command is transferred with a function of "DG_CONTROL/DAT_USERINTERFACE/MSG_ENALEDS" of the TWAIN protocol that the application uses when the option is set, the controller 130 converts this into "sane_control_option" of the corresponding SANE protocol using the mapping table 300.

If a scanner option setting command is transferred to the image scanning device, the scanner stores the set value and waits for a user's scan command in a standby state.

If the user inputs the scan command in the application, a function of DG_IMAGE/DAT_IMAGENTIVEXFER/MSG_GET" of the TWAIN protocol is used, and the controller 130 converts this into "sane_start, sane_read" that is the corresponding SANE protocol function using the mapping table 300.

The image scanning device that has received the user's scan command forms an image file from the document based on the set value.

When a scan has been completed, a function of DG_CONTROL/DAT_IDENTITY/MSG_CLOSEDS of the TWAIN protocol is used, and the controller 130 converts this into "sane_cloxe, sane_exit" that is the corresponding SANE protocol function using the mapping table 300.

The image scanning device that has completed a scan runs through a process of initialization or discarding the scan, as necessary.

In the above-described exemplary embodiment, it is exemplified that the protocol is converted into the SANE protocol regardless of the kind of the protocol that the application uses. However, if the predetermined specific protocol is another protocol, the protocol may be converted into another protocol that is not the SANE protocol.

Figure 4:
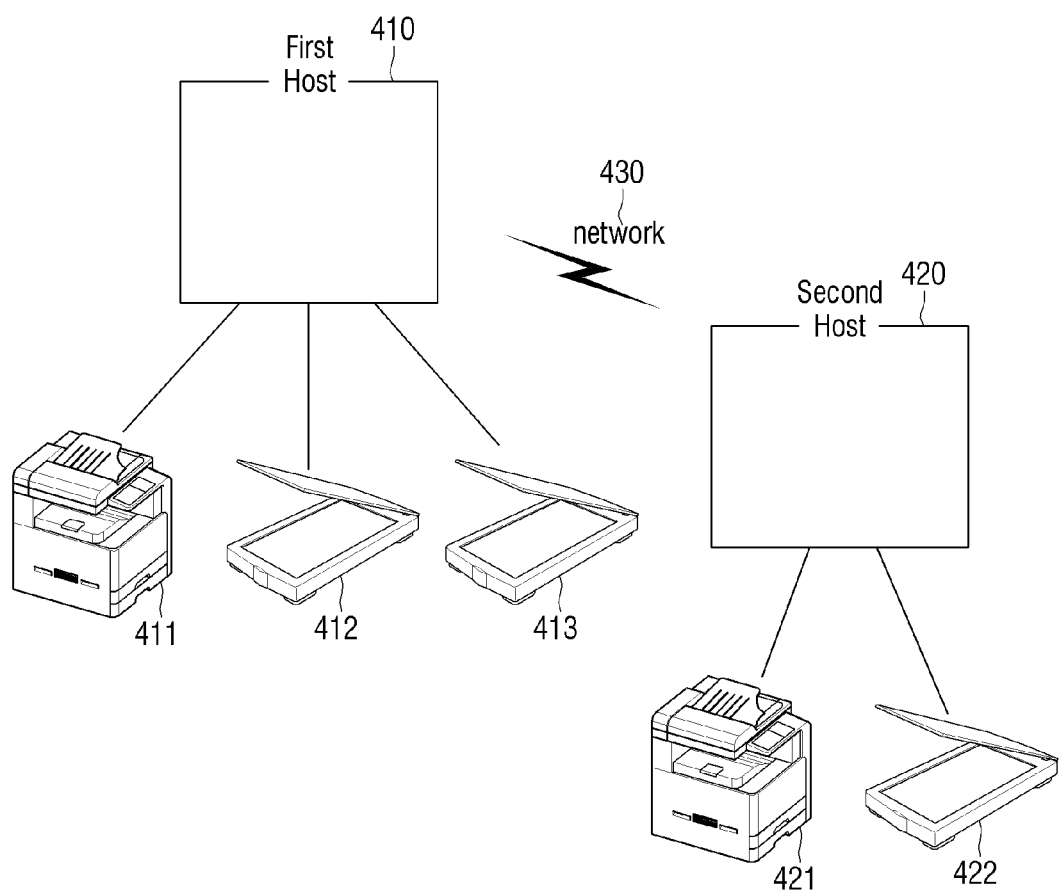
FIG. 4 is a diagram explaining a method of sharing scanners connected to host devices on a network according to an exemplary embodiment of the present general inventive concept.

FIG. 4 is a diagram explaining a method of sharing scanners connected to a remote host device according to an exemplary embodiment of the present general inventive concept.

In this exemplary embodiment, it is exemplified that a first host device 410 is locally connected to one multifunctional peripheral 411 and two scanners 412 and 413, a second host device 420 is locally connected to one multifunctional peripheral 421 and one scanner 422, and the host device 1 410 and the host device 2 420 are connected through a network 430. First and second host devices 410 and 420 may include analogous features to those of the exemplary host device 100 illustrated in FIGS. 1 and 2.

If the user searches for the image scanning devices connected to the first host device 410, a list of the searched image scanning devices is displayed.

In the case of converting the protocol that the application uses into the SANE protocol according to an exemplary embodiment of the present general inventive concept, image scanning devices of the second host device 420 connected through the network 430 can be shared with the first host device 410, and thus scanners shared with the remote host (the second host device 420) may be searched for and displayed.

For example, in the case where the user searches for only the image scanning devices locally connected to the first host device 410, only the image scanning devices 411 to 413 connected through the USB or the like are displayed. However, if an IP address of the second host device 420 remotely connected is input and an image scanning device search command is input using the SANE protocol, the image scanning devices 421 to 422 connected to the remotely connected second host device 420 are searched for and displayed.

Thus, according to the above-described exemplary embodiment, the image scanning devices that are locally connected to the second host device 420 can be shared with the first host device 410 even if the first host device 410 is not connected to the image scanning devices directly or through the network 430.

Figure 5:
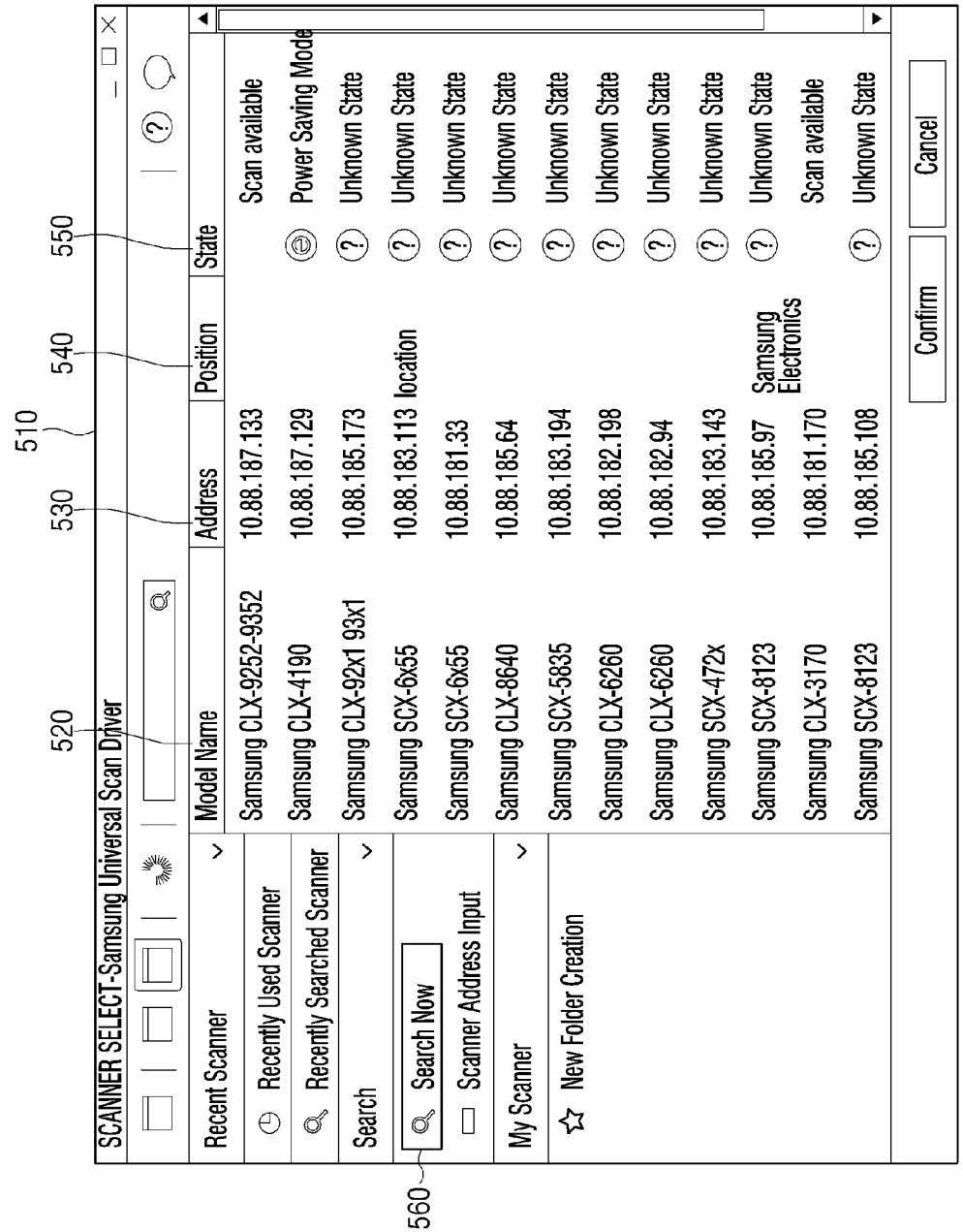
FIG. 5 is a diagram explaining a method of selecting an image scanning device connected to a host device through a scanner selection program.

FIG. 5 is a diagram explaining a method of selecting one of a plurality of image scanning devices connected to a host device.

If the user executes a scanner selection program provided by the integrated driver, a scanner selection popup window 510 is activated. In the scanner selection popup window 510, scanners connected to the host device locally or through the network are displayed by model names 520.

According to an exemplary embodiment of the present general inventive concept, device information of the connected scanner may include a model name 520, a network address 530, a position 540, and a device state 550. A search function 560 is also provided to search for a specific scanner.

In the section of the model name 520, a model name of the scanner is displayed.

In the section of the network address 530, an IP address is displayed in the case where the scanner is connected to the host device through the network. However, in the case where the scanner is connected by wire, for example by a USB cable rather than through the network, the related information may be displayed.

In the section of the position 540, information on a place where the scanner is currently located is displayed. In the case where a plurality of scanners is connected to one host device, the user may not recognize which is the scanner that corresponds to the model name 520, and so the information on the position where the scanner is located is provided.

If the user selects a desired scanner with reference to various kinds of information about the device and presses a confirm button in the scanner selection popup window 510, the selected scanner can perform the scan operation.

However, as described in the above-described exemplary embodiments, other device information may be further included, and device information desired by the user may be set to be displayed.

On the other hand, in the case of converting the protocol that the application uses into the SANE protocol according to an exemplary embodiment of the present general inventive concept, scanners connected to a remote host device can also be shared in addition to the scanners connected to the host device locally or through the network.

If the section of the search 560 is selected on the scanner selection popup window 510, a UI window to search for scanners connected to the remote host device is displayed.

Figure 6:
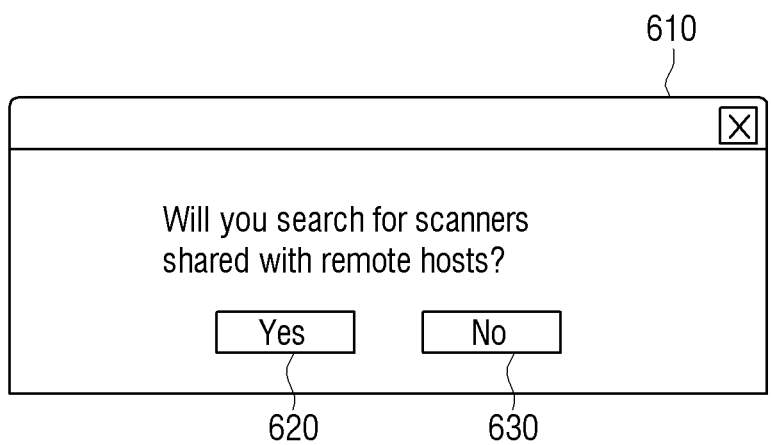
FIG. 6 is a diagram illustrating a UI window to share a scanner connected to a remote control device according to an exemplary embodiment of the present general inventive concept.
Figure 7:
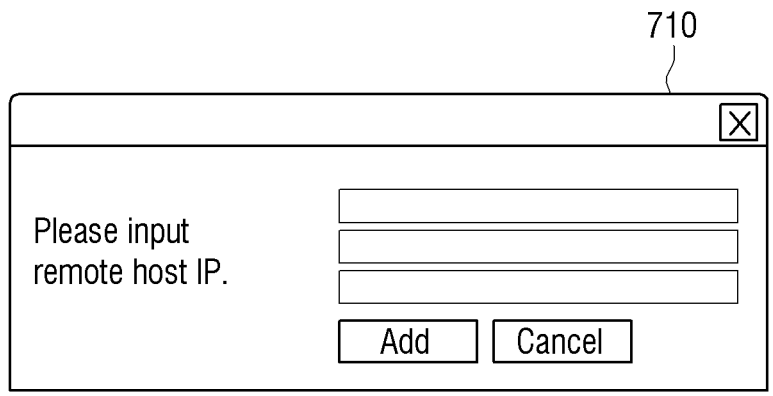
FIG. 7 is a diagram illustrating a UI window to input an IP address of a host device according to an exemplary embodiment of the present general inventive concept.

FIGS. 6 and 7 are diagrams illustrating UI windows to search for scanners connected to a remote control device according to an exemplary embodiment of the present general inventive concept.

If the search function 560 is selected on the scanner selection popup window 510, a UI 610 to enquire whether to search for scanners connected to the remote host device is provided, as illustrated in FIG. 6.

At this time, if the user desires to search for only devices directly connected to the host device by wire or through the network, and exclude the scanners connected to a remote host device from the search, the user may press a "No" button 630. In this case, only the scanners connected to the host by wire or wirelessly are searched for and displayed on the scanner selection popup window 510.

By contrast, if the user selects a "Yes" button 620 on the UI window 610, a separate UI window to input an IP address of the host device to which the scanner that is desired to be shared is connected among the remotely connected host devices is generated, as illustrated in FIG. 7.

FIG. 7 is a diagram illustrating a UI window 710 to input an IP address of a host device according to an exemplary embodiment of the present general inventive concept.

If the user inputs the IP address of the host device on the UI window 710 to input the IP address, a scanner that is connected to the corresponding host device by wire or wirelessly is additionally displayed on the scanner selection popup window 510.

On the other hand, IP addresses of a plurality of host devices may be input, and in this case, scanners connected to the respective host devices are displayed on the scanner search popup window 510.

Figure 8:
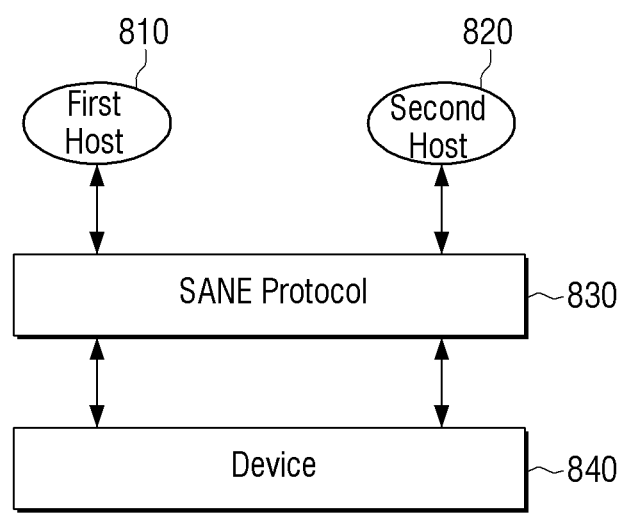
FIG. 8 is a diagram explaining a method of sharing a scan driver using a common protocol through a host device according to an exemplary embodiment of the present general inventive concept.

FIG. 8 is a diagram explaining a method of sharing a scan driver using a common protocol through a host device according to another exemplary embodiment of the present general inventive concept.

In this exemplary embodiment, it is assumed that different O/Ss (Operating Systems) are used between the host devices. For example, a first host device 810 may use a Windows-based O/S and a second host device 820 may use a Linux-based O/S.

In the related art, since scan drivers independently operate between the host devices or applications and use different protocols, it is not possible for a remotely connected PC to access or share the scanners.

Even if the same protocol is used, the API differs depending on the O/S to operate differently, and thus the scan drivers are unable to be shared between different kinds of O/Ss.

However, according to an exemplary embodiment of the present general inventive concept, if the protocol that is used in the scan driver is converted into the SANE protocol 830 and the interaction with the device 840 is performed, the scan drivers can be shared between the O/Ss through a network, and thus the user convenience is increased.

Further, since the management through the SANE standard API is integratedly performed, the update and management can be easily performed, and the same driver structure can be maintained regardless of the kind of the O/S or the kind of the scan protocol.

For example, even if different O/Ss are used in the first host device 810 and the second host device 820 as in an exemplary embodiment of the present general inventive concept, the driver used in the respective host devices and the applications can be integratedly managed.

Further, a remotely connected host device may access and use the scanner that is connected to the respective host devices by wire or wirelessly.

Figure 9:
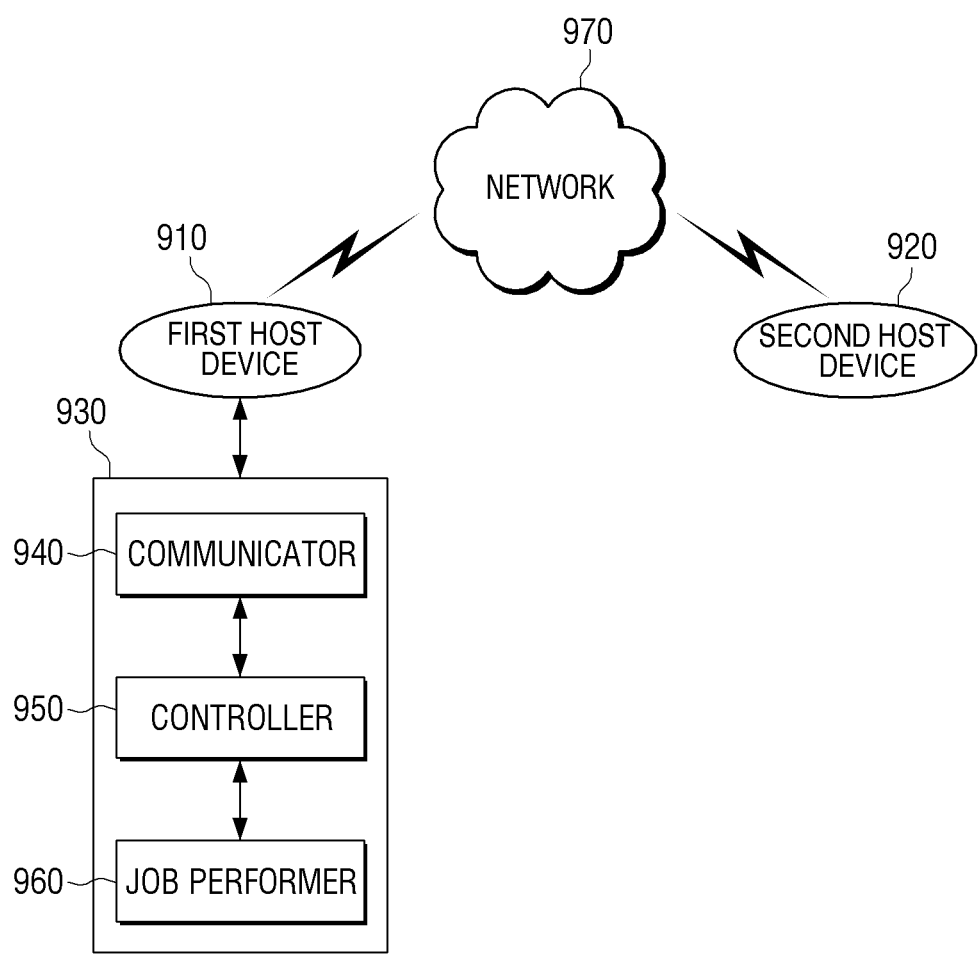
FIG. 9 is a diagram explaining an image scanning device according to an exemplary embodiment of the present general inventive concept.

FIG. 9 is a diagram explaining an image scanning device according to an exemplary embodiment of the present general inventive concept.

In this exemplary embodiment, it is exemplified that an image scanning device 930 is locally connected to a first host device 910 and a second host device 920 is connected to the first host device 910 through a network 970, which may be analogous to the network 430 illustrated in FIG. 4.

Referring to FIG. 9, the image scanning device includes a communicator 940, a controller 950, and a job performer 960.

The communicator 940 is connected to an external host device through a network or locally to receive data and commands. That is, the communicator 940 may be connected to the first host device 910 through a local interface or may be connected to the network 970 by wire or wirelessly. As the wireless communication standards, IEEE (Institute of Electrical and Electronics Engineers) 802.11 standard in U.S.A., Hyper LAN standard in Europe, and MMAC-PC standard in Japan may be used, for example.

According to an exemplary embodiment of the present general inventive concept, since the protocol used in the application of the first host device 910 is converted into the SANE protocol regardless of the kind of the protocol, the first host device 910 and the image scanning device 930 can perform mutual interaction through the SANE protocol.

The controller 950 controls the overall operation of the image scanning device according to the data or the command of the external device connected to the communicator 940 or a user's selection command input through the user interface (not illustrated).

Specifically, if a scan command is input in the printer driver or an application installed in the first host device 910, the controller 950 converts this into the SANE protocol, converts the corresponding command into a language that is used in the image scanning device 930, and transfers the language to the job performer 960 of the image scanning device, which actually performs the scan operation.

The controller 950 receives the scan command through the communicator 940, controls the job performer 960 to perform the scan operation, and transmits image data to the first host device 910.

In the case of converting the protocol used in the application of the first host device 910 into the SANE protocol regardless of the kind of the protocol and interacting with the image scanning device 930 according to an exemplary embodiment of the present general inventive concept, the second host device 920 connected to the first host device 910 through the network 970 is locally connected to the first host device 910 to share the image scanning device 930.

For example, if a user of the second host device 920 inputs the IP address of the first host device 910, the image scanning device 930 locally connected to the first host device 910 is searched for.

If the user of the second host device 920 selects the image scanning device 930 and inputs the scan command, the user's scan command is converted into the SANE protocol, and is transmitted to the first host device 910 connected through the network 970.

Thereafter, if the image scanning device 930 performs the scan operation through the above-described processes, the scanned image information is transmitted again to the second host device 920 through the first host device 910 and the network 970.

Figure 10:
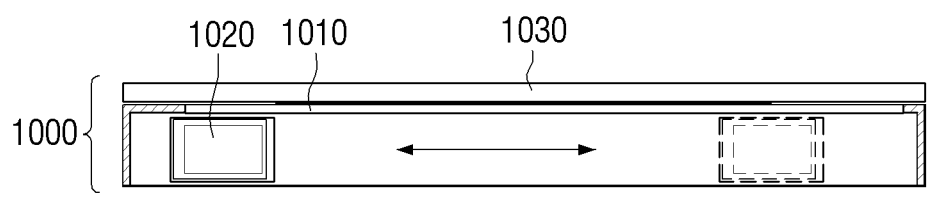
FIG. 10 is a diagram explaining in detail a job performer of an image scanning device according to an exemplary embodiment of the present general inventive concept.

FIG. 10 is a diagram explaining in detail a job performer of an image scanning device according to an exemplary embodiment of the present general inventive concept.

In the present general inventive concept, it is exemplified that the image scanning device is a flatbed scanner. FIG. 10 illustrates a side cross-section view of such a scanner 1000.

The flatbed scanner 1000 may include a flatbed plate 1010, a scanning unit 1020 movably installed on a bottom surface of the flatbed plate 1010, and a flatbed cover 1030 covering the flatbed plate 1010.

The flatbed plate 1010 is made of a transparent material since the document to be scanned is placed on the flatbed plate 1010 and light emitted from a backlight of the scanning unit 1020 penetrates the flatbed plate 1010.

The scanning unit 1020 may include an image sensor (not illustrated) and a backlight (not illustrated). As the image sensor, a CCD or CMOS may be used, and the resolution and the color depth of the scanner are determined by the image sensor.

If a scan operation command is input, the scanning unit 1020 moves on the bottom surface of the flatbed plate 1010 on which the document is placed, and the light from the backlight is emitted to the target document.

If information on the light reflected from the document is input to the image sensor as analog information, this information is converted into a digital signal ("0" and "1") through an A/D converter.

An image processor (not illustrated) of the flatbed scanner 1000 includes a DSP (Digital Signal Processor) that processes the digital signal and a buffer memory. The digital signal processed through the DSP is transferred to the host device and the contents of the document are converted into an image file.

The flatbed cover 1030 protects the scanning unit 1020 from foreign substances, and serves to prevent the light emitted from the backlight of the scanning unit 1020 from being spread outside of the flatbed scanner 1000 during the scanning operation.

In this exemplary embodiment, it is exemplified that the image scanning device is a flatbed scanner. However, the image scanning device may also be implemented by a drum scanner that performs scanning operation through rotation of a drum at high speed in a state where the document is put on the cylindrical drum, a film scanner that performs scanning operation through permeation of the light through the film, or a MFP (Multifunctional Peripheral) having a scanner portion.

Figure 11:
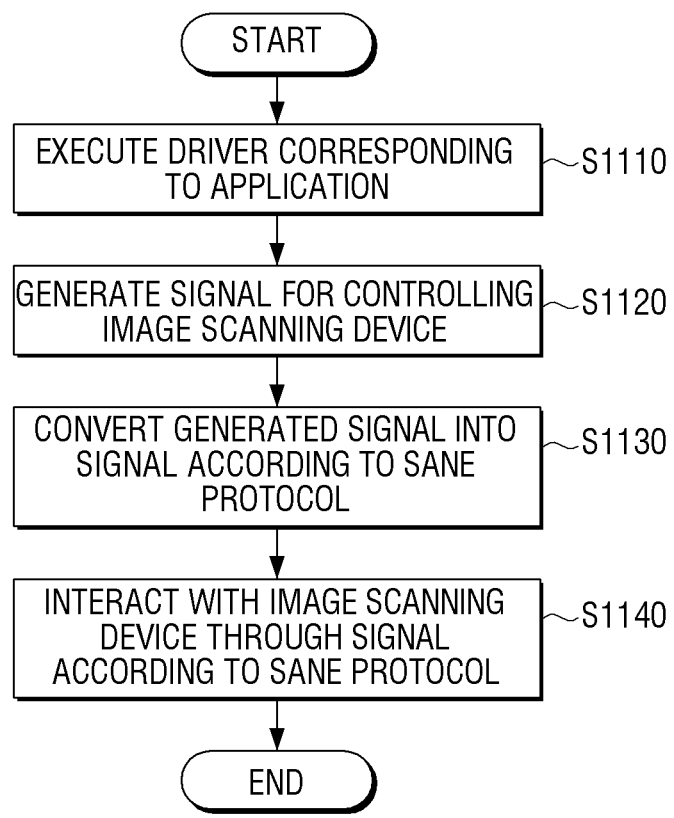
FIG. 11 is a flowchart illustrating a method of controlling a host device according to an exemplary embodiment of the present general inventive concept.

FIG. 11 is a flowchart illustrating a method of controlling a host device according to an exemplary embodiment of the present general inventive concept. For the purposes of this exemplary embodiment, components from the exemplary embodiment of the host device 100 illustrated in FIGS. 1 and 2 are referred to herein.

If the user executes an application, a driver that supports the protocol that is used in the application is executed (operation S1110). If the user sets the scanning option or inputs a scan command in the application, a signal according to the protocol used in the application is generated (operation S1120).

The controller 130 converts the generated signal into a signal according to the SANE protocol regardless of the kind of the protocol that is used in the application (operation S1130). During the protocol conversion, the controller 130 converts the signal generated by the integrated driver into the signal according to the SANE protocol using the mapping table.

The controller 130 interacts with the image scanning device using the converted SANE protocol (operation S1140). In the case of interacting through conversion of the SANE protocol as described above, the image scanning device locally connected to the remote host device can be shared, and one driver can be integratedly used regardless of the kind of the O/S.

FIG. 12 is a flowchart illustrating a method of searching for a scanner connected to a host device according to an exemplary embodiment of the present general inventive concept.

If the scanner search program that is provided by the integrated driver starts, the scanners connected to the host device can be searched for (operation S1210). At this time, a UI window to enquire whether to search for the scanners connected to a remotely connected host device, in addition to the scanners connected to the host device by wire or wirelessly, may be provided (operation S1220).

If the user desires to search for only the scanners that are locally connected, only the scanners connected to the host device by wire, such as USB, or directly connected through the network are searched for (operation S1230).

By contrast, in the case where the user desires to search for the scanners connected to the remote host device, a UI window to input the IP address of the remotely connected host device pops up (operation S1240), and if the IP address of the host device to which the scanners that are desired to be shared are connected is input (operation S1250), a final search list including the scanners connected to the remote host device is provided (operation S1260).

On the other hand, in the above-described exemplary embodiments, it is exemplified that only the IP address of the one remote host device is input. However, IP addresses of a plurality of host devices may be input, and in this case, all scanners connected to the plurality of host devices are searched for.

If the protocol used in the application is converted into the preset protocol and the interaction with the image scanning device is performed as in the present general inventive concept, the scanner drivers can be shared between the different O/Ss through the network, and the image scanning device connected to the remote host device can be shared.

On the other hand, a memory management method of a terminal device according to various exemplary embodiments of the present general inventive concept as described above may be implemented by program codes and may be stored in a non-transitory computer readable medium to be provided to respective servers or devices.

The non-transitory computer readable medium means a device-readable medium which does not store data for a short time, such as a register, a cache, and a memory, but semi-permanently stores the data. Specifically, the above-described various applications or programs may be provided and stored in the non-transitory computer readable medium, such as a CD, a DVD, a hard disk, a Blu-ray disk, a USB, a memory card, and a ROM.

Further, according to the preferred embodiments of the present general inventive concept, it is illustrated and described that the protocol used in the application is converted into the SANE protocol. However, the present general inventive concept is not limited to the above-described specific embodiments. Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of controlling a host device which is connected to at least one image scanning device and is connected to another host device connected to at least one image scanning device, the method comprising:

when the host device executes an application, executing, by the host device, a driver that corresponds to the executed application from among the plurality of drivers which are supported by an integrated driver;

selecting, by the host device, an image scanning device from among at least one image scanning device connected to the host device and at least one image scanning device connected to the other host device;

generating, by the host device, a signal for controlling the selected image scanning device according to a first protocol corresponding to the executed driver;

converting, by the host device, the generated signal according to a second protocol which is different from the first protocol; and when the selected image scanning device is connected to the host device, transferring, by the host device, the converted signal to the selected image scanning device, and when the selected image scanning device is connected to the other host device, transferring, by the host device, the converted signal to the other host device, wherein the first protocol and the second protocol are communication protocols for data exchange between the host device and an image scanning device.

2. The method of claim 1, wherein the second protocol is a SANE (Scanner Access Now Easy) protocol.

3. The method of claim 2, wherein the first protocol is one of TWAIN, ICDM and WIA protocols.

4. The method of claim 1, further comprising:

searching for image scanning devices connected to the host device and the other host device; and displaying a list of the searched image scanning devices, wherein the selecting comprises selecting one of the image scanning devices in the list.

5. The method of claim 1, wherein generating the signal according to the first protocol comprises:

displaying a scanning option selection UI (User Interface) according to an execution of the driver; and when a scanning option is set on the scanning option selection UI, generating the signal to include a set value according to the first protocol.

6. The method of claim 5, further comprising:

receiving a scanned image from the image scanning device according to the scanning option; and displaying an application execution screen including the received image.

7. The method of claim 6, wherein the scanning option includes at least one of resolution, document source information, whether to support page count, an image type, a maximum support size, optical resolution, a supportable compression method, whether to support encryption, and whether to support user authentication.

8. The method of claim 1, further comprising:

receiving a job command, which is generated according to the first protocol, from the other host device that is connected to the host device through a network;

converting the received job command into a job command according to the second protocol;

transferring the converted job command to the selected image scanning device using the second protocol;

when the selected image scanning device acquires an image through performing an image scanning job according to the converted job command, receiving the acquired image according to the second protocol; and transferring the received image to the other host device according to a protocol used in the network device.

9. A host device comprising:

an interface which is connected to at least one image scanning device and is connected to another host device connected to at least one image scanning device;

a storage storing an integrated driver that supports a plurality of drivers corresponding to a plurality of applications; and a controller controlling the integrated driver that supports the plurality of drivers to execute the driver corresponding to an application that is executed in the host device from among the plurality of drivers, an inputter to receive a user input to select an image scanning device from among at least one image scanning device connected to the host device and at least one image scanning device connected to the other host device;

wherein the controller generates a signal for controlling the selected image scanning device according to a first protocol corresponding to the executed driver, the controller converts the generated signal according to a second protocol which is different from the first protocol, and when the selected image scanning device is connected to the host device, the controller transfers the converted signal to the selected image scanning device through the interface, and when the selected image scanning device is connected to the other host device, the controller transfers the converted signal to the other host device through the interface, wherein the first protocol and the second protocol are communication protocols for data exchange between the host device and an image scanning device.

10. The host device of claim 9, wherein the second protocol is a SANE (Scanner Access Now Easy) protocol.

11. The host device of claim 10, wherein the first protocol is one of TWAIN, ICDM and WIA protocols.

12. The host device of claim 9, further comprising:

a display displaying a list of the plurality of image scanning devices connected to the host device and the other host device, wherein the inputter receives the user input to select one of the image scanning devices on the list, wherein the controller executes the driver corresponding to the selected image scanning device using the integrated driver.

13. The host device of claim 12, wherein the display displays a scanning option selection UI (User Interface) when the driver is executed, and the converted signal generated by the controller includes a set value according to the first protocol when a scanning option is set on the scanning option selection UI.

14. The host device of claim 13, wherein when an image that is scanned by the selected image scanning device according to the scanning option is received, the controller displays an application execution screen including the received image on the display.

15. The host device of claim 14, wherein the scanning option includes at least one of resolution, document source information, whether to support page count, an image type, a maximum support size, optical resolution, a supportable compression method, whether to support encryption, and whether to support user authentication.

16. The host device of claim 9, wherein when a job command, which is generated according to the first protocol, is received from the other host device that is connected to the host device through a network, the controller converts the received job command into a job command according to the second protocol and transfers the converted job command to the selected image scanning device, and when the selected image scanning device acquires an image through performing an image scanning job according to the converted job command, the controller receives the acquired image according to the second protocol and transfers the received image to the other host device.

17. A non-transitory computer-readable medium storing a program for implementing a method of controlling a host device which is connected to at least one image scanning device and is connected to another host device connected to at least one image scanning device, the method comprising:

when the host device executes an application, executing, by the host device, a driver that corresponds to the executed application from among the plurality of drivers which are supported by an integrated driver;

selecting, by the host device, a image scanning device from among at least one image scanning device connected to the host device and at least one image scanning device connected to the other host device;

generating, by the host device, a signal for controlling the selected image scanning device according to a first protocol corresponding to the executed driver;

converting, by the host device, the generated signal according to a second protocol which is different from the first protocol; and when the selected image scanning device is connected to the host device, transferring, by the host device, the converted signal to the selected image scanning devices, and when the selected image scanning device is connected to the other host device, transferring, by the host device, the converted signal to the other host device, wherein the first protocol and the second protocol are communication protocols for data exchange between the host device and an image scanning device.

* * * * *